United States Patent
Harrington et al.

(10) Patent No.: US 10,565,835 B2
(45) Date of Patent: Feb. 18, 2020

(54) CONTROL AND MONITORING OF LIGHT-EMITTING-DIODE (LED) BULBS

(71) Applicant: RTC Inc., Dexter, MI (US)

(72) Inventors: Richard H. Harrington, Dexter, MI (US); Charles W. Krapf, Livonia, MI (US)

( * ) Notice: Subject to any disclaimer, the term of this patent is extended or adjusted under 35 U.S.C. 154(b) by 0 days.

(21) Appl. No.: 15/173,202

(22) Filed: Jun. 3, 2016

(65) Prior Publication Data

US 2016/0284176 A1    Sep. 29, 2016

Related U.S. Application Data

(63) Continuation-in-part of application No. 14/160,160, filed on Jan. 21, 2014.
(Continued)

(51) Int. Cl.
| | |
|---|---|
| *G08B 3/00* | (2006.01) |
| *G08B 7/06* | (2006.01) |
| *F21K 9/232* | (2016.01) |
| *H05B 33/08* | (2020.01) |
| *F21V 23/04* | (2006.01) |

(Continued)

(52) U.S. Cl.
CPC ................ *G08B 7/06* (2013.01); *F21K 9/232* (2016.08); *F21V 23/04* (2013.01); *H05B 33/0857* (2013.01); *H05B 33/0863* (2013.01); *H05B 37/0272* (2013.01); *H05B 37/034* (2013.01); *F21S 9/022* (2013.01); *F21V 3/02* (2013.01); *F21V 23/0478* (2013.01); *F21V 23/0485* (2013.01); *F21V 33/0076* (2013.01); *F21Y 2115/10* (2016.08); *G08B 13/1672* (2013.01); *G08B 13/19602* (2013.01); *G08B 17/06* (2013.01); *G08B 17/117* (2013.01); *G08B 17/12* (2013.01); *G08B 21/12* (2013.01);
(Continued)

(58) Field of Classification Search
None
See application file for complete search history.

(56) References Cited

U.S. PATENT DOCUMENTS

| | | | |
|---|---|---|---|
| 4,358,754 A | 11/1982 | Young et al. | |
| 4,375,637 A * | 3/1983 | Desjardins | G08B 29/08 340/10.31 |

(Continued)

FOREIGN PATENT DOCUMENTS

CN    202374535    8/2012

*Primary Examiner* — Julie B Lieu
(74) *Attorney, Agent, or Firm* — John G. Posa; Belzer PC (57) ABSTRACT

A smart light-emitting-diode (LED) bulb includes apparatus enabling the bulb to be turned ON, OFF, or dimmed without the use of a wall switch. Such apparatus may include circuitry responsive to rotating the LED portion of the bulb, circuitry responsive to touching or tapping on the bulb, or a Bluetooth or WiFi interconnection enabling the bulb to be controlled using a smartphone or other device executing a bulb-control application. Other apparatus may include a microphone enabling the bulb to be controlled with a voice, sound or music. In other embodiments, apparatus enabling the bulb to be turned ON, OFF, or dimmed may include a power line communication (PLC) interface enabling the bulb or bulbs to be controlled via the Internet. A camera or image sensor may be provided enabling the bulb to be gesture-controlled. A system may include a plurality of smart LED light bulbs.

19 Claims, 12 Drawing Sheets

Related U.S. Application Data (60) Provisional application No. 61/754,662, filed on Jan. 21, 2013.

(51) Int. Cl.
| | | |
|---|---|---|
| *H05B 37/03* | (2006.01) |
| *H05B 37/02* | (2006.01) |
| *F21S 9/02* | (2006.01) |
| *F21V 3/02* | (2006.01) |
| *F21Y 115/10* | (2016.01) |
| *G08B 17/06* | (2006.01) |
| *F21V 33/00* | (2006.01) |
| *G08B 21/12* | (2006.01) |
| *G08B 25/00* | (2006.01) |
| *G08B 29/18* | (2006.01) |
| *G08B 17/12* | (2006.01) |
| *G08B 25/10* | (2006.01) |
| *G08B 17/117* | (2006.01) |
| *G08B 13/196* | (2006.01) |
| *G08B 13/16* | (2006.01) |

(52) U.S. Cl.
CPC ............ *G08B 25/009* (2013.01); *G08B 25/10* (2013.01); *G08B 29/181* (2013.01); *Y02B 20/48* (2013.01)

(56) References Cited

U.S. PATENT DOCUMENTS

| | | | |
|---|---|---|---|
| 7,597,455 B2 | 10/2009 | Smith et al. |
| 7,883,242 B2 | 2/2011 | Ng et al. |
| 8,251,544 B2* | 8/2012 | Ivey .................... F21V 33/0052 |
| | | | 362/234 |
| 8,393,757 B2 | 3/2013 | Uemoto et al. |
| 8,742,694 B2 | 6/2014 | Bora et al. |
| 8,967,831 B2 | 3/2015 | Chien |
| 2003/0112145 A1 | 6/2003 | Allen et al. |
| 2004/0007993 A1 | 1/2004 | Weng |
| 2006/0192670 A1 | 8/2006 | Tice |
| 2007/0008726 A1 | 1/2007 | Brown |
| 2008/0001551 A1 | 1/2008 | Abbondanzio et al. |
| 2008/0094857 A1* | 4/2008 | Smith ................ H05B 33/0842 |
| | | | 362/649 |
| 2009/0262548 A1 | 10/2009 | Ando |
| 2009/0303702 A1 | 12/2009 | Ellis et al. |
| 2010/0102960 A1 | 4/2010 | Simon et al. |
| 2010/0141153 A1 | 6/2010 | Recker et al. |
| 2011/0044047 A1 | 2/2011 | Mandy et al. |
| 2011/0058037 A1* | 3/2011 | Hanses ................ G08B 17/125 |
| | | | 348/143 |
| 2012/0001548 A1 | 1/2012 | Recker et al. |
| 2012/0120661 A1 | 5/2012 | Uemoto et al. |
| 2012/0188771 A1 | 7/2012 | Kraus et al. |
| 2013/0211613 A1 | 8/2013 | Praske et al. |
| 2013/0231796 A1 | 9/2013 | Lu et al. |
| 2013/0285827 A1 | 10/2013 | Ivey et al. |
| 2014/0136195 A1 | 5/2014 | Abdossalami et al. |
| 2014/0184080 A1 | 7/2014 | Rybickl et al. |
| 2014/0312802 A1 | 10/2014 | Recker |
| 2015/0070897 A1 | 3/2015 | Chien |
| 2015/0156840 A1 | 6/2015 | Wiscombe et al. |

* cited by examiner

Rotating Top LED Design

CONTROL AND MONITORING OF LIGHT-EMITTING-DIODE (LED) BULBS

REFERENCE TO RELATED APPLICATIONS

This application is a continuation-in-part of U.S. patent application Ser. No. 14/160,160, filed Jan. 21, 2014, which claims priority from U.S. Provisional Patent Application Ser. No. 61/754,662, filed Jan. 21, 2013, the entire content of both of which is incorporated herein by reference.

FIELD OF THE INVENTION

This invention relates generally to light-emitting-diode (LED) bulbs and, in particular, to improvements in the control and monitoring of LED bulbs.

BACKGROUND OF THE INVENTION

Light-emitting-diode (LED) lamps offer long service life and high energy efficiency. While initial costs are currently higher than those of fluorescent and incandescent lamps, prices are expected to fall dramatically in the coming years. LED lamps are now made to replace screw-in incandescent or compact fluorescent light bulbs. Most LED lamps replace incandescent bulbs rated from 5 to 60 watts, though again, much higher wattages and brightness are anticipated.

Incandescent bulbs have a typical life of 1,000 hours, compact fluorescents about 8,000 hours. LED bulbs are more power-efficient than compact fluorescent bulbs and offer lifespans of 30,000 or more hours, reduced if operated at a higher temperature than specified. Indeed, the higher purchase cost compared to other types of bulbs may already be more than offset by savings in energy and maintenance.

LED bulbs maintain output light intensity well over their life-times, and they are also mercury-free, unlike fluorescent lamps. LED lamps are also available with a variety of color properties. Several companies offer LED lamps for general lighting purposes. The technology is improving rapidly and new energy-efficient consumer LED lamps are available. Some models of LED bulbs work with dimmers of the type used for incandescent lamps.

SUMMARY OF THE INVENTION

This invention relates generally to light-emitting-diode (LED) bulbs and, in particular, to improvements in the control and monitoring of LED bulbs. A smart light-emitting-diode (LED) bulb according to certain embodiments includes a base portion that screws into a conventional light-bulb socket, a light-emitting portion that includes one or more LEDs, and apparatus enabling the bulb to be turned ON, OFF, or dimmed without the use of a wall switch.

Apparatus enabling the bulb to be turned ON, OFF, or dimmed may include circuitry responsive to rotating the LED portion of the bulb. Apparatus enabling the bulb to be turned ON, OFF, or dimmed may include circuitry responsive to touching or tapping on the bulb. Alternative apparatus may include a Bluetooth or WiFi interconnection enabling the bulb to be controlled using a smartphone or other device executing a bulb-control application. Further apparatus enabling the bulb to be turned ON, OFF, or dimmed includes a microphone enabling the bulb to be controlled with a voice, sound or music.

In other embodiments, apparatus enabling the bulb to be turned ON, OFF, or dimmed may include a power line communication (PLC) interface enabling the bulb or bulbs to be controlled via the Internet. A camera or image sensor may be provided enabling the bulb to be gesture-control led.

A system may include a plurality of light bulbs, each including a base portion that screws into a conventional light-bulb socket and a light-emitting portion that includes one or more LEDs. A wireless mesh network may enable each bulb to measure temperature and light output, enabling each bulb to function as a fire detector. A smart phone may be programmed to call 911 with a pre-programmed message in the event that one of the bulbs detects a fire. The bulbs may include a light sensor operative to detect a modulated light intensity as fire produces irregular light output. An interface may be provided enabling each bulb to generate a status report regarding bulb temperature, current draw or intensity.

DETAILED DESCRIPTION OF THE INVENTION

Figure 1:
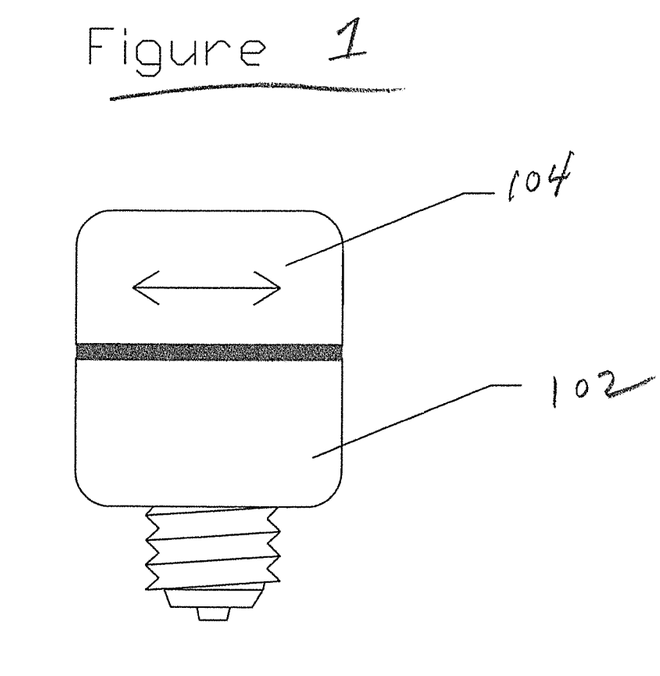
FIG. 1 shows an LED bulb with a rotating top to effectuate dimming.

This invention improves upon existing LED bulb technology by providing various control and monitoring options. In terms of control, since LED bulbs are not overly hot to the touch, a novel way to control the LED bulb is to turn a portion of the entire bulb. As shown in FIG. 1, the bulb is provided in two parts, the first part 102 being stationary in the electrical outlet after it is first screwed in. The second part 104, which can rotate relative to the in-socket portion, contains the LEDs. A potentiometer may conveniently be used to detect the degree of rotation and adjust the brightness accordingly using known or yet-to-be developed dimmer technologies.

Figure 2:
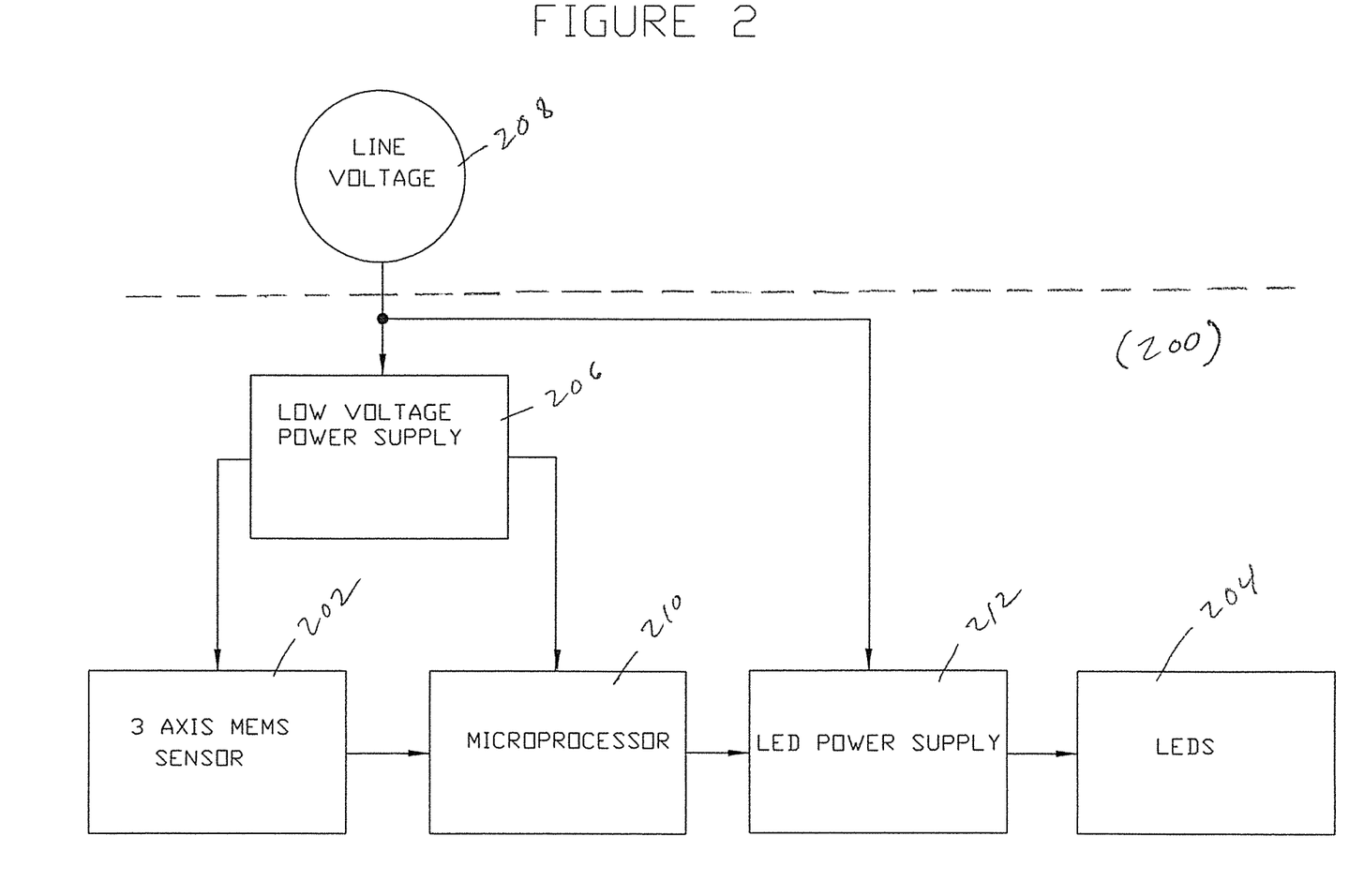
FIG. 2 illustrates the use of a MEMS sensor to determine the angular position and adjust the brightness of an LED bulb.
Figure 3:
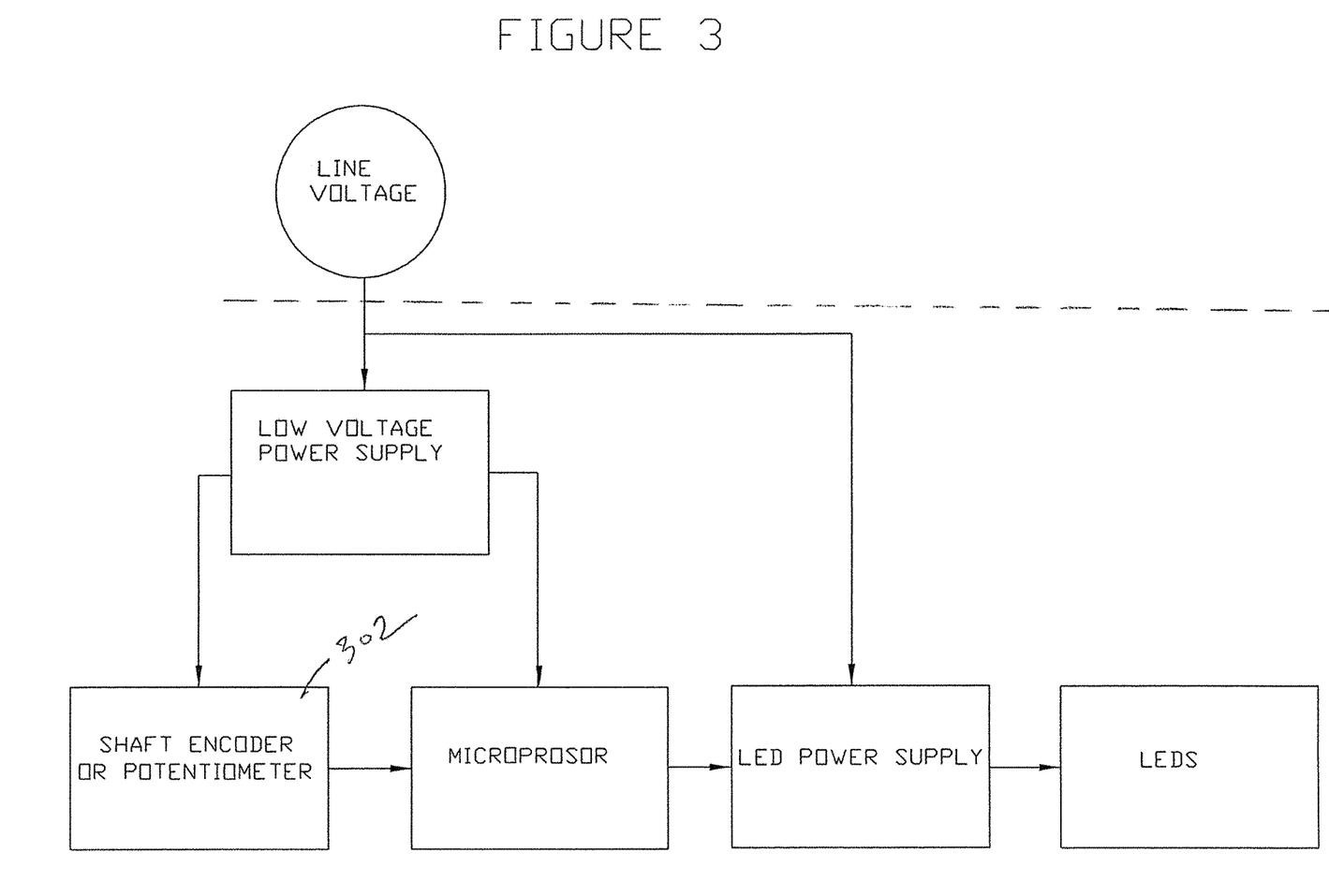
FIG. 3 illustrates the use of a shaft encoder or potentiometer to determine the angular position and adjust the brightness of an LED bulb.

As alternatives, a shaft encoder or a 3-axis (MEMS) tilt sensor may be used to determine the angular position and adjust the brightness. As shown in FIG. 2, a 3-axis MEMS sensor 202 allows the bulb 204 to be in any position and still recognize the relative rotation of the bulb. Turning the bulb will adjust its brightness from full on to totally off. In this embodiment, a low-voltage power supply 206 connected to the AC line 208 provides power to a microprocessor 210 that receives a signal from the 3-axis MEMS sensor 202 to control a higher power LED supply 212. The LED supply 212 controls the LEDs 204 from the AC line based upon the dimmer signals received from the micro 210. FIG. 3 illustrates how a shaft encoder 302 may be used in place of the MEMS tilt sensor of FIG. 2. Note that in FIGS. 2 and 3 and the remaining Figures, the components below the broken line, (200), for example, are all contained in the LED bulb adapted to be screwed into a socket or otherwise coupled to line voltage.

Tapping the bulb is yet another way to adjust brightness in accordance with the invention. As one example, tapping the bulb at the zero degree point of the accelerometer or 3-axis tilt sensor will turn the bulb down or off depending on embedded microprocessor programing. Tapping the bulb at the 90 degree point of the accelerometer or 3-axis tilt sensor may adjust it to 25 percent brightness, for example. Tapping the bulb at the 180 degree point of the accelerometer or 3 axis tilt sensor will adjust it to 50 percent, and tapping the bulb at the 270 degree point of the accelerometer or 3-axis tilt sensor will adjust it to 75 percent brightness. Tapping the bulb at the 330 degree point of the accelerometer or 3 axis tilt sensor will adjust it to 100 percent brightness.

Figure 4:
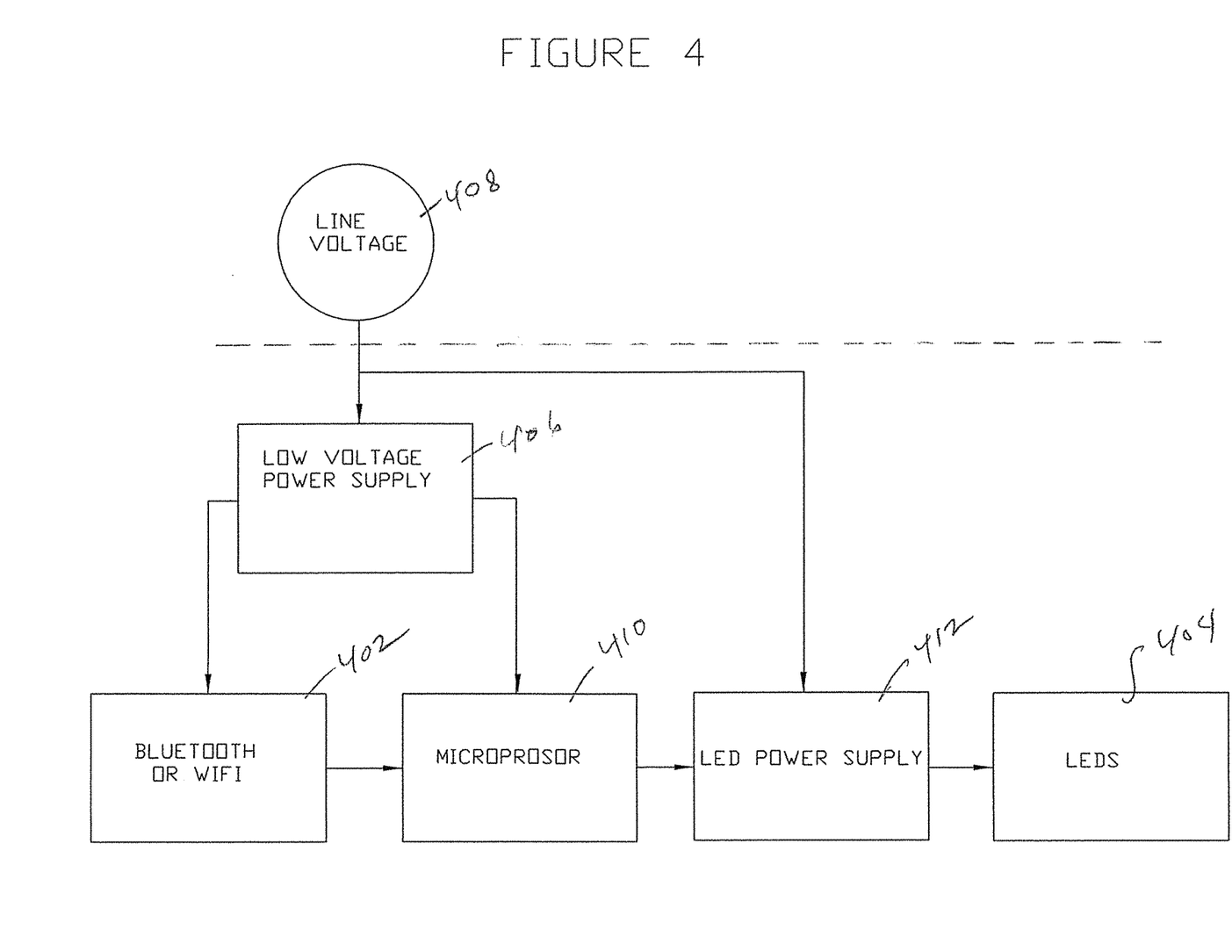
FIG. 4 depicts the implementation of a Bluetooth or WiFi connection.

As a different control option, a smartphone with Bluetooth or WiFi may be used to control the LED bulbs using a specially written application for a smart phone, for example. As shown in FIG. 4, such an LED bulb will be equipped with a Bluetooth radio or WiFi interface. In this embodiment, a low-voltage power supply 406 connected to the AC line 408 provides power to the Bluetooth radio or WiFi interface 402 and a microprocessor 410 that receives a signal from block 402 to control a higher power LED supply 412. The LED supply 412 controls the LEDs 404 from the AC line 408 based upon the dimmer signals received from the micro 410.

Figure 5:
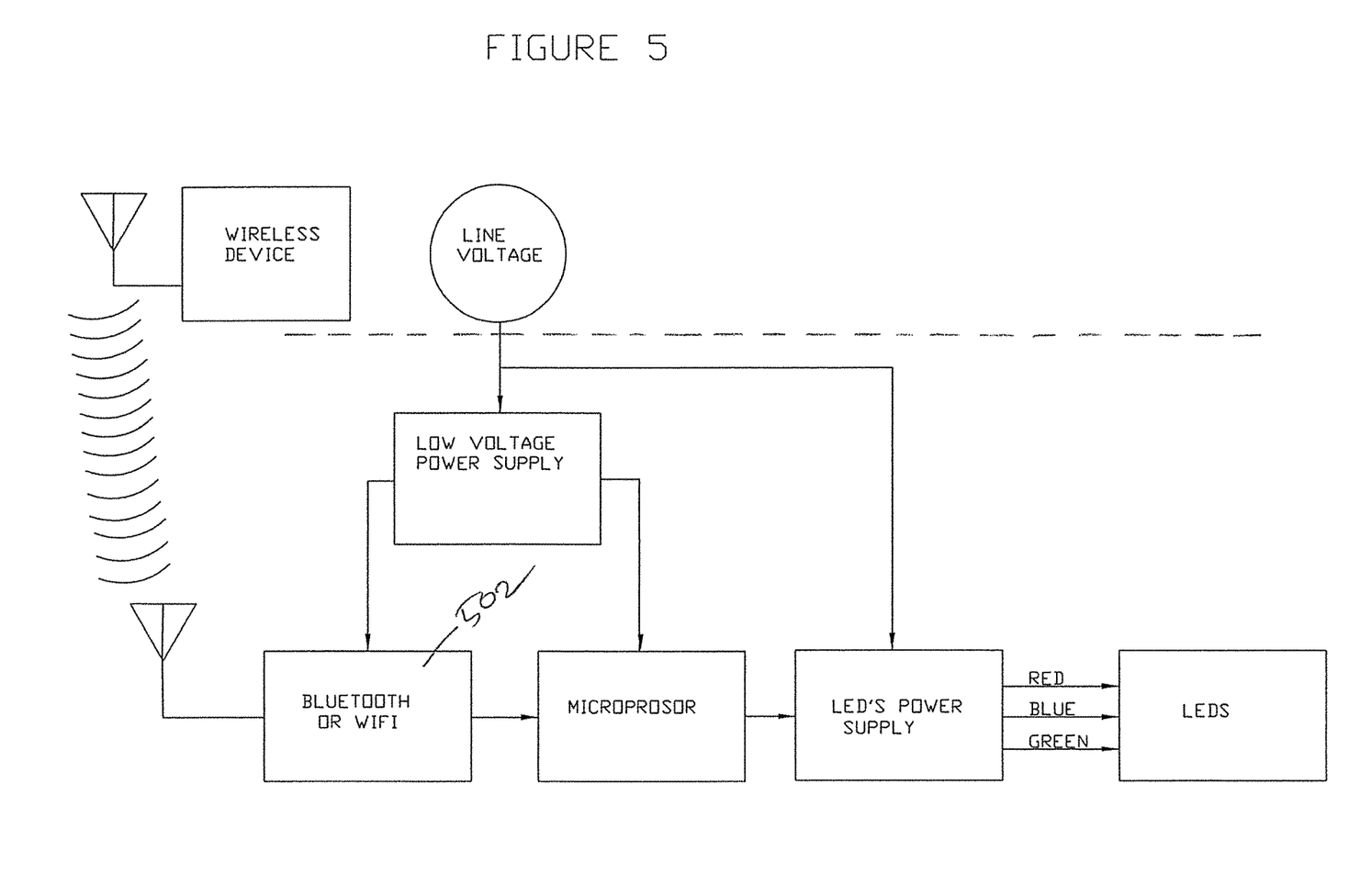
FIG. 5 shows the use of a wireless Bluetooth or WiFi connection.

FIG. 5 illustrates the use of a wireless signal received by a Bluetooth or WiFi interface 502. When it is first plugged in, the bulbs in FIGS. 4 and 5 will be 'found' and 'connected' to the iPHONE, smartphone or other device. The device application will ask for name to be assigned to that LED bulb. Once it has a Name (ID), the bulb may be controlled by the phone application in many ways, such as a voice command (i.e., "Hall Light On"). Intensity may be adjusted by a voice command such as "Hall Light 50% Brightness." If the LED Bulb is multicolor, it can be commanded to a specific color using a voice command such as "Hall Light Warm White."

The use of a smart application may further be used to modulate both the intensity and the color by talking or singing into the phone. The color will track the frequency, and the intensity of the bulb will track the voice volume. Yet another attribute of this design is to have the smartphone use its "music" function to control the color and intensity of the bulb(s). The effect in this case will be that of a 'color organ.'

Figure 6:
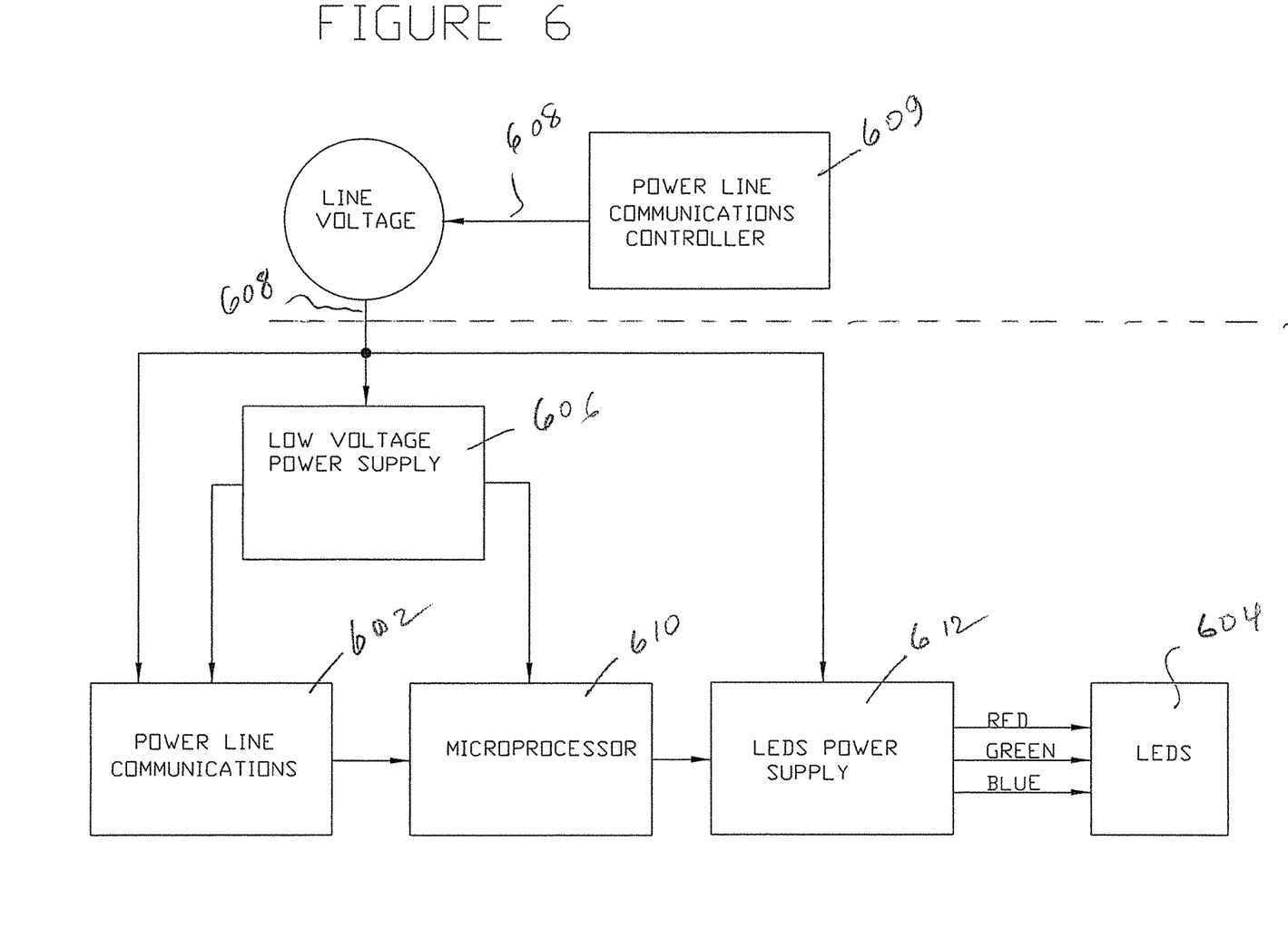
FIG. 6 illustrates the use of a power line communications (PLC) controller.

Yet another control function involves the use of the Internet to control a smart bulb. In this embodiment, depicted in FIG. 6, a home or office computer would be equipped with power line communication (PLC 609) that sends digital or analog data over the power line 608. The LED bulb would also have PLC 602 built in, such that each smart bulb responds to its ID and changes its intensity and or color according to the commands sent over the NET. In this way, a house or office, factory can help prevent theft by turning on and off the smart bulbs at appropriate times. As with FIGS. 2-5, a low-voltage power supply 606 connected to the AC line 608 provides power to the PLC interface 602 and a microprocessor 610 that receives a signal from block 602 to control a higher power LED supply 612. The LED supply 612 controls the LEDs 604 from the AC line 608 based upon the signals received from the micro 510.

Figure 7:
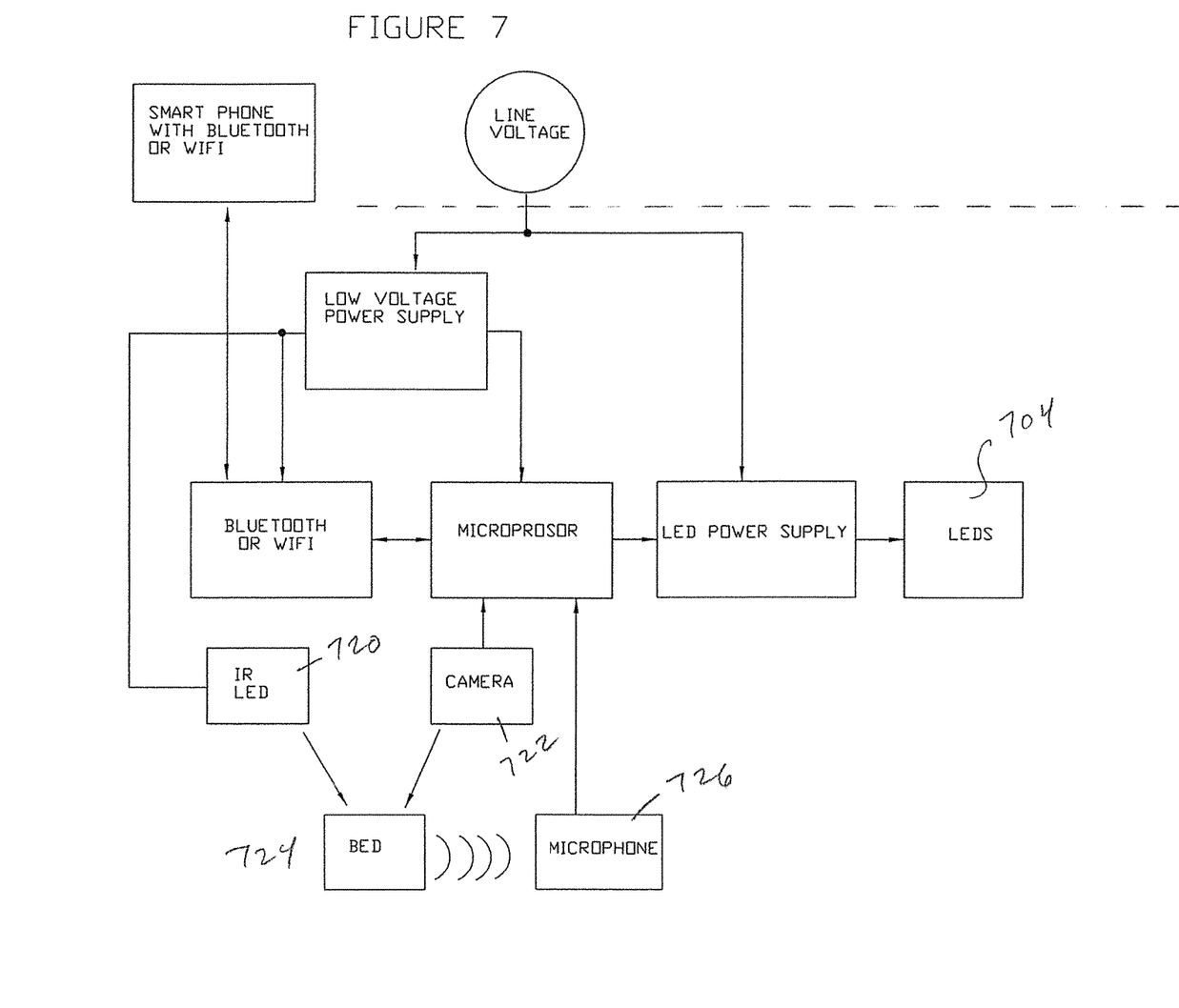
FIG. 7 illustrates a smartphone-enabled system incorporating an optional IR LED, camera and microphone to construct a baby monitor, for example.
Figure 8:
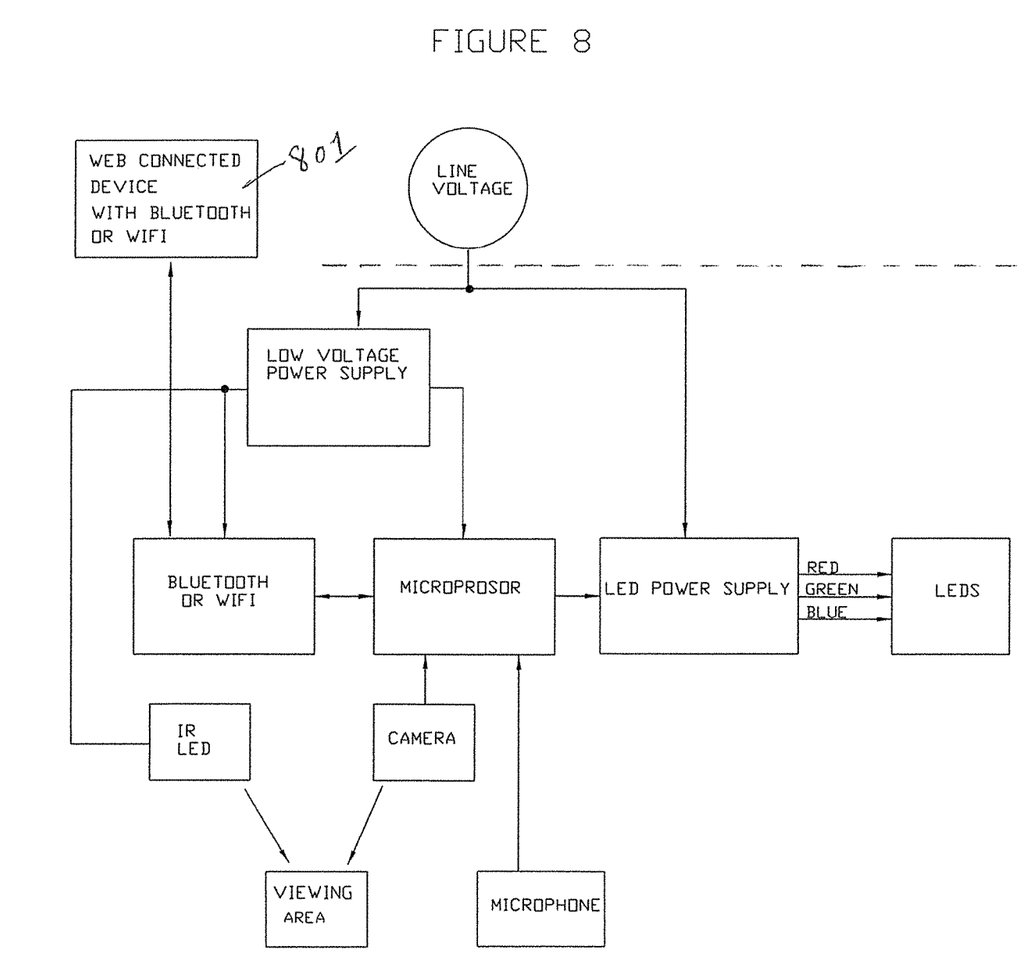
FIG. 8 illustrates an Internet-enabled system incorporating an optional IR LED, camera and microphone to construct a security system, for example.

A smart Bluetooth LED bulb may also have a build-in microphone that can be used as a baby monitor, or as an intrusion alert. FIG. 7 illustrates a smart phone implementation. FIG. 8 shows the data may be communicated over a Bluetooth radio or via PLC to a computer or other device 801 that is web connected. In addition to a microphone, the smart bulb can also have a camera for use as the baby monitor and or the intrusion alert. As shown in FIG. 7, for example, an infrared (IR) LED 720 may be used so that it is invisible to humans, but can be seen with a camera 722 equipped with this capability. This would be valuable for a baby monitor, as it would not interfere with a baby's sleep. The sound that the microphone 726 picks up may be transmitted over the web to a computer with sound pattern recognition that could then be programmed to open or close a door, call a phone, or simple turn the LEDs 704 on or off. An optional speaker phone could be activated such that a simple "HELP" command could activate a 911 call.

Another way to turn the light ON and OFF is to use gestures that a camera sees and a microprocessor recognizes. The circuits of FIGS. 7 and 8 are applicable to this embodiment. The micro may be pre-programmed to recognize gesture recognition, and may also have the ability to be taught new gestures to control brightness and color. In addition to hand gestures, movement alone could be used to turn on the LEDs. This could be used as a convenience and also as an anti-theft device. The lamp could also be programmed to send a message and or the camera image over the web to a web site used to monitor single or multiple LED bulbs with built in cameras and web access.

Figure 9:
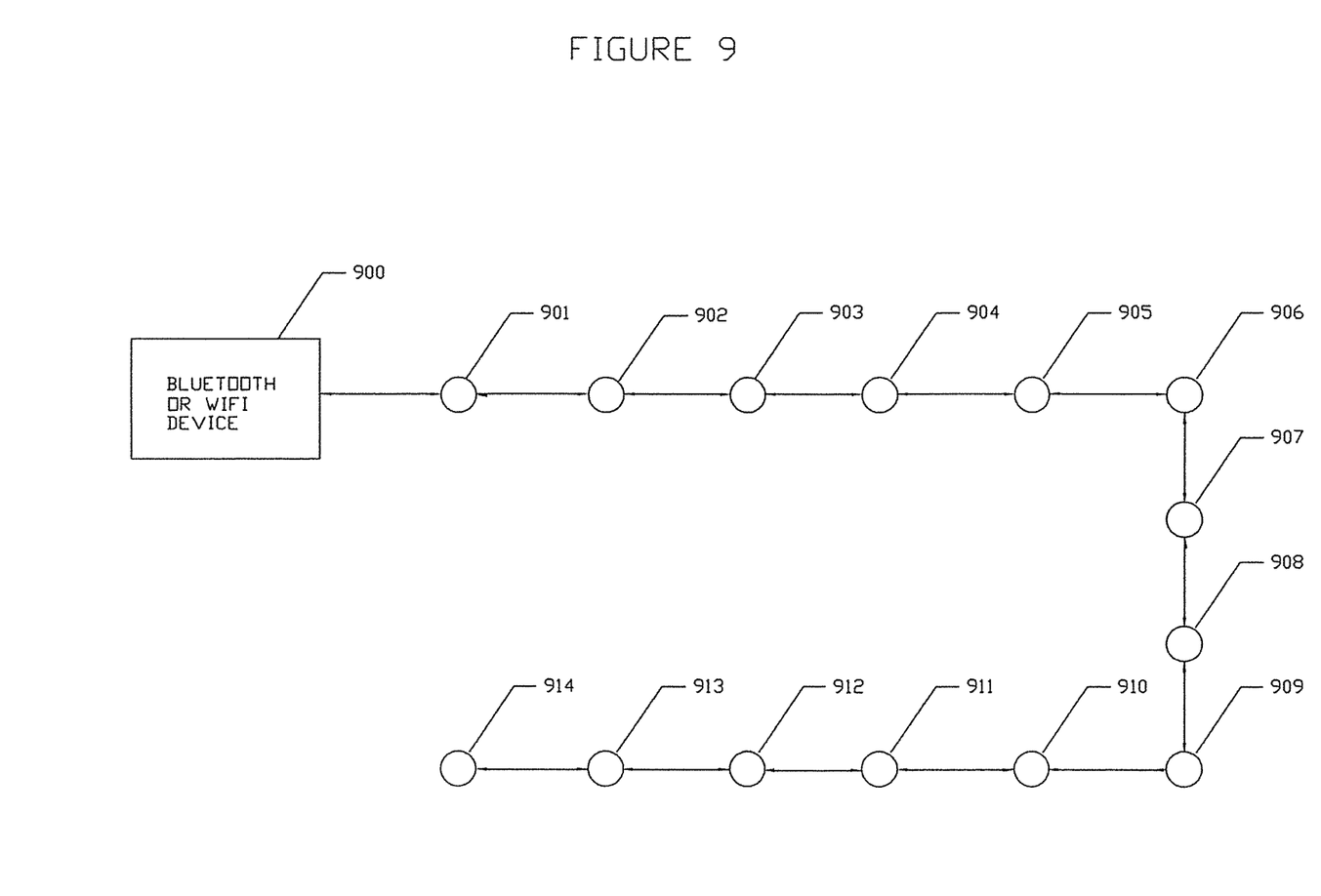
FIG. 9 depicts a Bluetooth- or WiFi-enabled system controlling a plurality of smart LED bulbs.

A Network of bulbs can be established by assigning ID's to each bulb and then assigning them to a particular network. FIG. 9 shows how a string of smart LED bulbs 901-914 may be controlled by a Bluetooth or WiFi device 900. A wireless Mesh network would work especially well as the commands are passed from bulb to bulb at RF ranges far beyond the point of command initiation such as the smart phone. Each bulb can send back status such as temperature, current draw and intensity if a light sensor is provided.

Given that each bulb can measure temperature and light output, the bulbs would function as a fire detector and the smart phone could be programmed to call 911 with a pre-programmed message. The light sensor would see a modulated light intensity as fire produces irregular light output.

Multiple Wavelength Fire Detection

To improve the fire detection ability of the LED bulb, multiple wavelengths of light may be monitored as follows:

1. Ultraviolet Detectors (UV) may be used to detect fire and also explosions. However, since UV detectors may also detect sunlight, the invention in this case uses a combination of hardware and software such that only UV that has predetermined dynamic components will flag the event as a fire or conversely an explosion. For example, assuming a fire or explosion will change the amplitude of the detected UV light, hardware such as a differentiator may be used to distinguish this over sunlight. Software may be implemented to do the differentiation as well, with more flexibility compared to the hardware approach.

2. Near IR detectors can also be used to detect fire. A single-frequency IR flame detector is typically sensitive to wavelengths around 4.4 micrometers, which is a spectral characteristic peak of hot carbon dioxide as is produced in a fire.

While the UV and IR detectors may be used independently, the combination of using both the UV and the IR sensor will greatly improve the fire detection capabilities of the Smart LED bulb.

Smoke Detection

According to the United States National Fire Prevention Association, photoelectric detectors are more sensitive to fires that begin with a long period of smoldering than ion-type detectors. Because we have both UV and IR detectors, and the smoke may be generated by various burnable sources, having both UV and IR detectors will enhance the detection capability.

Carbon Monoxide Detection

Yet another feature of the Smart LED Bulb is the ability to detect and warn the inhabitants of high carbon monoxide levels. This can be done using one of several detectors such as a metal oxide semiconductor, a biomimetic sensor that changes color, an electrochemical sensor which changes its conductivity or by using the Full Spectrum Detection described below. In addition to the above sensing techniques, the use of a far infrared sensor can be used such as a far infrared (FIR) thermopile sensor.

Full Spectrum Detection

One variation of the Smart LED bulb is the ability to analyze the full spectrum of light. This will enable it to detect a broad range of harmful substances such as methane, propane or a chemical spill. This will be done using the UV sensor, the IR sensor, a CCD camera and a far infrared (FIR) sensor such as a thermopile. This may be implemented with a diffraction grating and a CCD. This combination can detect absorption lines of various chemicals such as combustible and non-combustible materials. A spectrum analysis can be in UV, IR or Visible spectrum.

Intruder Detection, Baby Watching

Yet another feature of this Smart LED bulb is using the CCD camera for security, intruder detection. This will be done by settings in a Smart Phone, or other smart device to function as a motion detector with sensitivity adjustments such that humans will be detected, but small animals will not be. The application will be able to send video to a smart device that is web connected as described herein.

Communications

The communications between the Smart LED bulbs may be any of the common networks used today as well as ones developed in the future that allow the Smart LED bulbs to communicate to each other as well as smart devices such as smart phones, iPADS, laptops, desktop computers. As mentioned above, if a fire or carbon monoxide is detected, the Smart LED bulbs will send a message to the smart device that can alert the occupants as well as calling 911 so that the situation can be taken care of.

Web Connections

An external device will be used to connect Blue Tooth, or other non-web based RF units so that connections to the World Wide Web will be possible. This will allow the local area network that the bulbs are connected to call an emergency phone number, send photos or video to smart phones or other smart devices such as computers.

Blinking

The fire and other chemical detection circuits may be connected to the LED bulb power drive such that it can turn the bulbs on and off to alert the occupants of the dwelling of a fire, or other hazards such as carbon monoxide, or other detectable substances it monitors. If the light is on, the blink duty cycle may be short so the visibility is not impaired.

If the power to the bulb is off, a rechargeable battery or super capacitors will be used to power either the main LEDs or a separate LED as a warning of fire, or some other hazard. A smart phone or other web connected device can be used to detect the particular hazard condition.

If a bulb experiences technical issues with its detectors, it can blink with a predetermined pattern to alert the user that it has a problem. This will also be communicated by network to the smart devices. The user could easily find the defective bulb, as it will be the only one blinking.

Battery or Super Capacitors

The battery and associated circuity that powers a LED or LED's shall provide enough light so that the occupants can find their way out of the building. The advantage of the rechargeable battery or super capacitors compared to the common Ion Fire detector is the fact that it does not need to be replaced twice a year. If either the battery or the Super Cap voltage is getting low on charge, that bulb in question can send a message over the network to have the occupant turn that circuit on for a few minutes in the case of the super cap, or for a few hours in the case the rechargeable battery. If the LED bulbs are connected to a Smart Power System, where the lights are controlled by a smart device, then merging the battery or super cap charging is done via a System Management program.

Blink Sequencing

In the event of smoke or fire, the bulbs will blink in an ordered sequence; follow the blinking lights to safety. Given that the bulbs all have sensors; the path to safety will be the one with the lease amount smoke, fire, or other hazardous material balanced with quickest and safest way out.

Communications between Bulbs

Given that the Smart bulbs may be connected to a wired or wireless network, when one bulb detects a hazardous condition, it will send a message to all the bulbs in the network to blink to alert the occupants of a dangerous condition. The smart phone, or other wireless device will indicate where and what has been detected.

Applications for Smart Devices

Applications for smart devices will be written and become available for all common devices. It will sound an alarm, show the type of hazard, and its location (which room in the house or building) and call 911 or some other emergency number entered into its application.

Wall Mounted Devices

Wall mounted devices that are powered by both the power line and battery back-up may contain multiple wireless communications. The first of which communicates directly with the LED bulb network, one that can communicate with cell phone towers, and also with the World Wide Web. This device will display all hazards including smoke, fire, carbon monoxide and other hazardous materials it can detect. The wall mounted devices can also have audio alarms such as a piezo device that produces intense sound levels to alert the occupants of a hazard.

Security Keys

This wall mounted device will also have two connection ports that communicate directly with the LED bulbs for security reasons. The bulb can screw directly into the wall mounted device and receive security keys that will be used with every transmission to the wall mounted device as well as to other bulbs connected to the network. Alternatively this connection between the bulb and the wall mounted device can be near field inductive coupling so that the bulb needs to be within a few inches of the wall mounted device for the security key exchange to occur. The use of security keys is very important as it will reduce the probability of hacking to a great extent.

Audio Alarms

The LED bulbs can also have audio alarms such as a piezo device or a speaker that produces intense sound levels to alert the occupants of a hazard. Both the bulb and the Wall Mounted Devices may also contain a speech synthesizer and a speaker so that the warning could pronounce words such as "Fire, Fire, Call 911 or High Carbon monoxide levels detected, call 911, leave the building or house".

The Bulb may also contain a microphone, or use the speaker as a microphone so that voice commands can be stored in its memory and played back so that each bulb can have a location stored in it such as "Living Room" or "Kids bedroom, Second floor, North side" Now when the fire is detected, the location will be announced by all bulbs connected to the network, sent to the Wall Mounted Device which will then call 911 and let the exact location of the fire be known to the fire department and also anyone in the house to quickly go to that location and remove the children, adults or animals.

If the building is equipped with water sprinklers, they could also be connected to the network and turn on the sprinklers at the exact location, and not all the sprinklers so that the fire could be put out, but cause minimal water damage.

Figure 10:
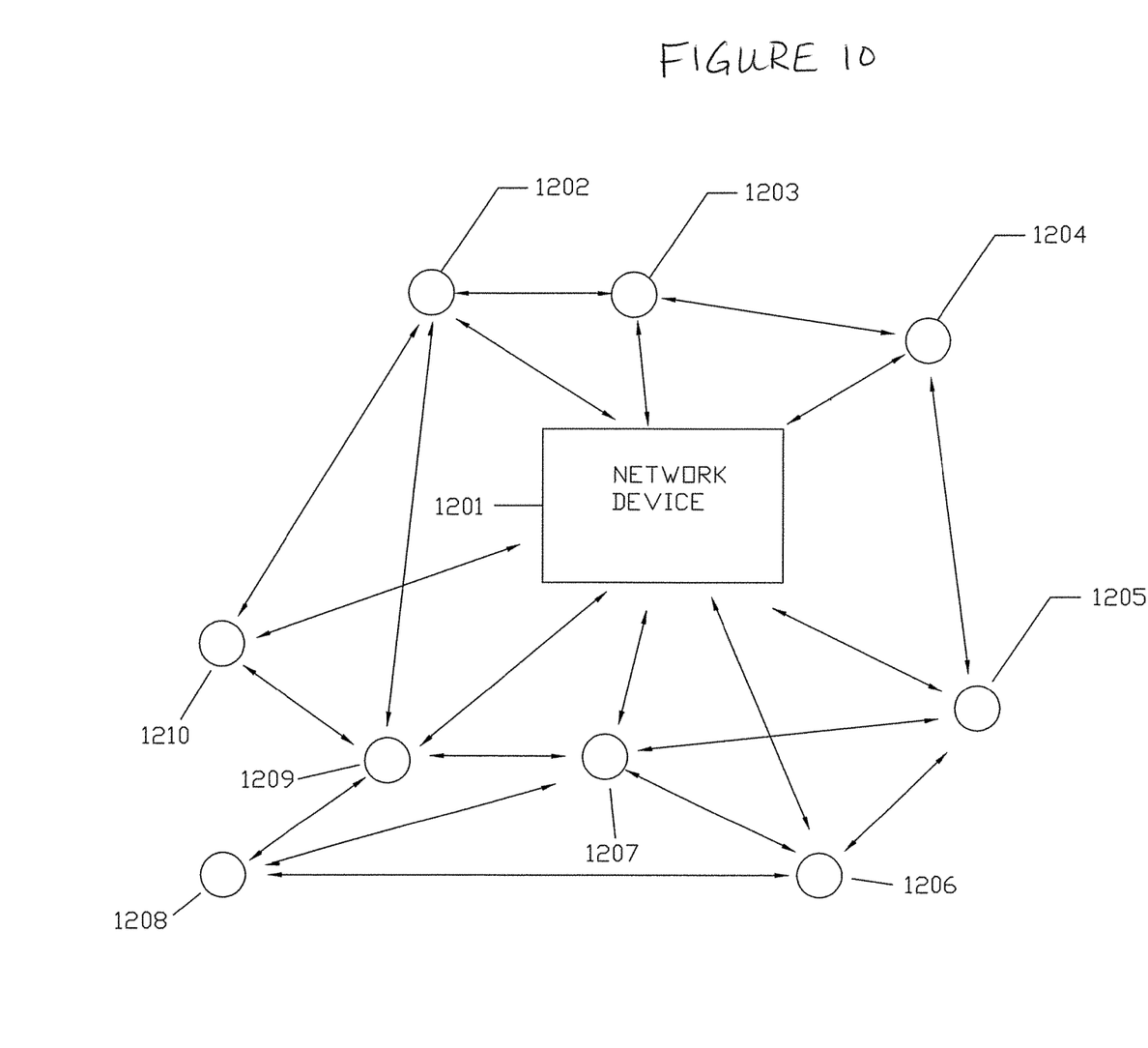
FIG. 10 shows a mesh network with the central hub.
Figure 11:
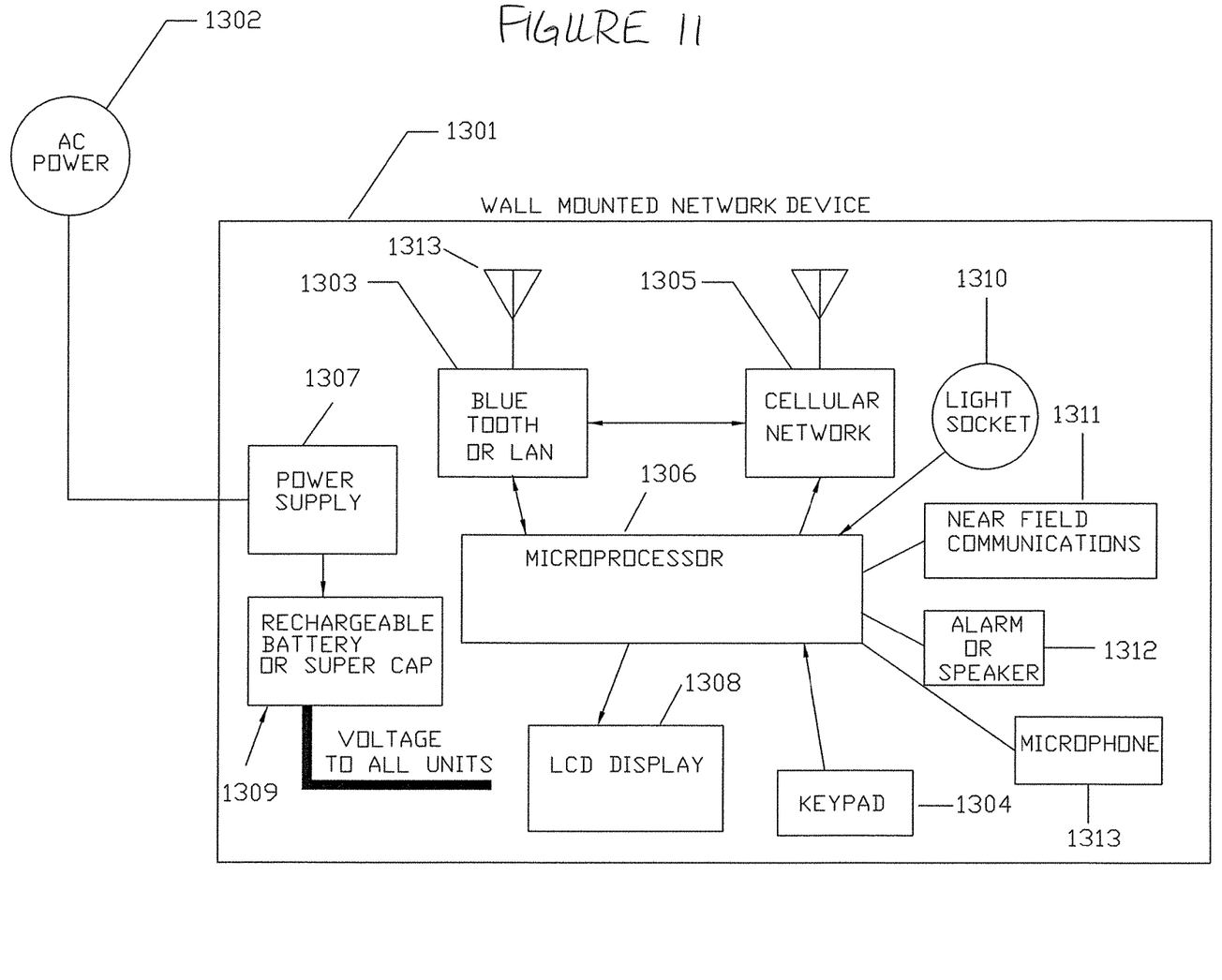
FIG. 11 shows the wall mounted network device.

FIG. 10 shows a mesh network with the central hub 1201 which contains all the network devices, power supplies, and is illustrated fully in FIG. 11. Each node such as 1202 through 1210 is a LED Bulb complete with various detectors or an output device such as a speaker. Illustrated in FIG. 12 are the various detectors such as: smoke; carbon monoxide; methane; full spectrum; camera, both visible and IR wavelengths.

A speaker or alarm device to alert the inhabitants of the detected substances. A microphone that can be used to send voice messages to the network device 1201 and in FIG. 11, item 1301 which can be sent to the proper emergency departments. FIG. 11 shows the wall mounted network device 1301 which has a connection to the AC power that charges the battery and or a super capacitor 1309 which supplies all the voltages to the devices inside the network device 1301. The network device has a minimum of two different radios, one of which is a cellular and one that is a LAN or a blue tooth 1303 for communications to the mesh network shown in FIG. 12. Item 1313 is an antenna. In addition to the Radios, it also contains an LCD Display 1308 used for displaying messages and status of the various LED bulbs in FIG. 12, items 1202 through 1210 it is wirelessly connected to.

Item 1310 is a Light Socket used for programming the addresses and an encryption key of each LED bulb. Using this method, a very secure system is in place so that hacking is reduced. The secure key is used such that each LED bulb must transmit messages that use the Key to encrypt the messages that is sent to the wall mounted network device 1301 and also each LED in the network. If messages are received, and not encrypted, they will be ignored as valid, however the wall mounted device FIG. 11, item 1301 will be able to display status of hacking attempts.

Figure 12:
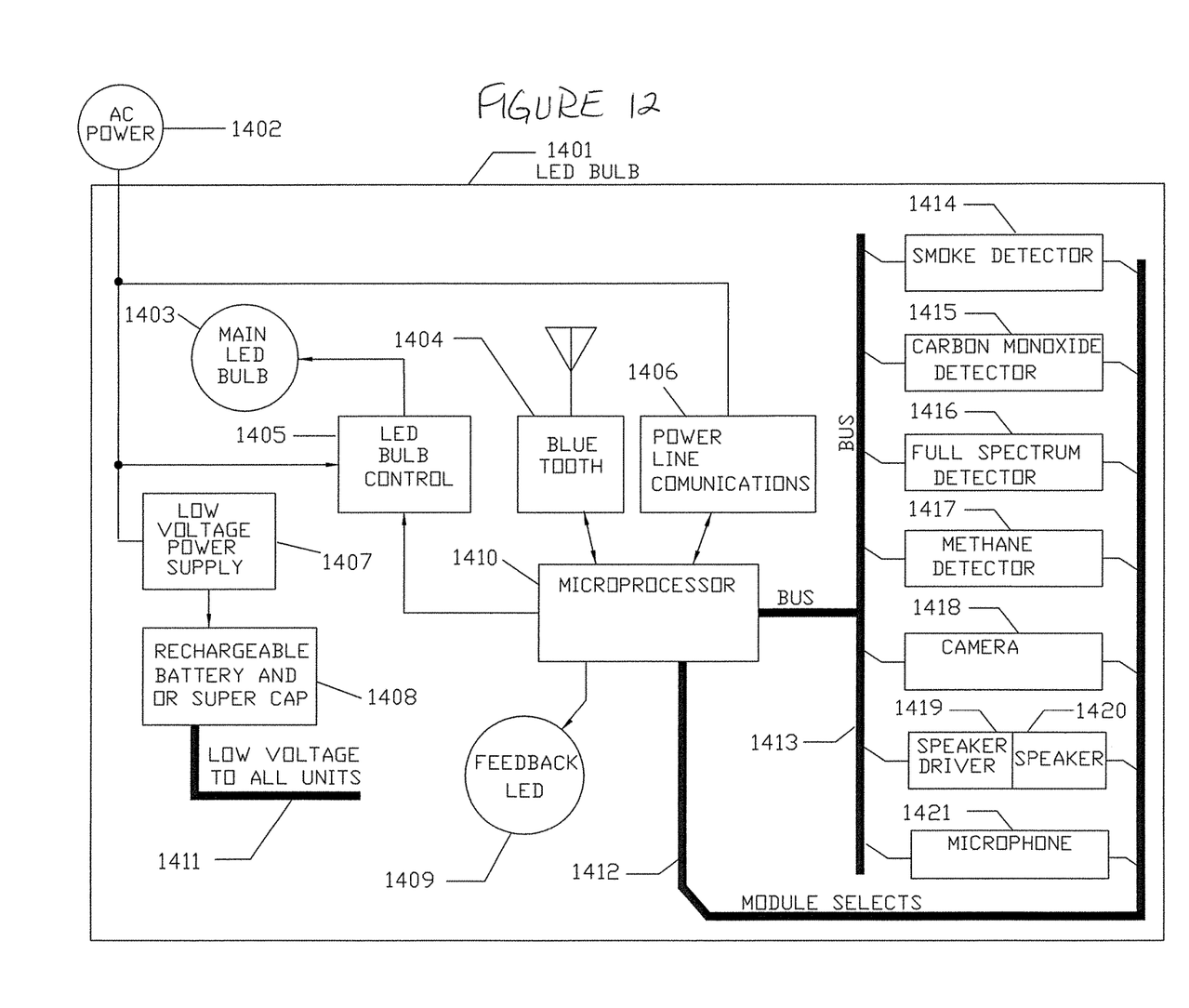
FIG. 12 shows various detectors such as: smoke; carbon monoxide; methane; full spectrum; camera, both visible and IR wavelengths.

Item 1311 represents a near-field communications device that can be used as a substitute for the Light Socket to send the key to a LED bulb FIG. 12, items 1202 through 1210. A microprocessor 1306 controls the wall mounted device 1301. It is the heart of the Mesh or other suitable network and is the only part of the system that can communicate with the emergency services such as the fire department or the local police using the cellular network 1305. Item 1312 represents a speaker or an alarm such as a piezo device that produces a very loud sound.

As mentioned earlier, the wall mounted network device 1301 can also blink all the lights it is connected to in addition to emitting the loud sounds. Not only is this an important warning to the hearing impaired, but also for able bodied individuals as it can blink in a preprogrammed sequence to guide the individuals out of the house in the safest and quickest way.

Item 1313 is a microphone that can be used to store voice data in the Microprocessor that can be sent to emergency services such as the fire department or the local police. This message can include the words: Fire, or Smoke, High Carbon Monoxide at xxxx address of home or office, this message will repeat as many times as needed. Numerical reference 1304 is a Keypad used for entering data into the Microprocessor.

In FIG. 12, item 1401 represents the LED Bulb that is normally powered by the AC Power 1402. Device 1408 is a rechargeable battery ands or a Super Capacitor used for powering the bulb and its monitoring equipment when the AC power is not present. 1407 Is a Low Voltage power supply that is used to charge the battery and or super capacitor that supplies voltage to all other detectors in this figure as well as the Microprocessor, the Blue Tooth Radio or other suitable network radio, the camera, the main LED bulb in case of AC power loss.

Item 1409 is a separate LED that is used for bulb status, blinks or constant on to notify the user of problems. Device 1414 comprises a smoke detector that communicates to the microprocessor 1410 that smoke is present, it will in turn send a message to the wall-mounted device 1301. Items 1415, 1416, 1417 communicate in the same way to the Microprocessor 1410 detecting the various harmful substances. Device 1418 is a camera is used for intruder detection, baby watching and other uses that are set up at the wall mounted device 1301.

The invention claimed is:

1. A smart light-emitting-diode (LED) bulb, comprising:
    a base portion including electrical contacts to be received by a light-bulb socket;
    a light-emitting portion that includes one or more LEDs powered through the electrical contacts of the light-bulb socket;
    full-spectrum detection apparatus disposed in the smart LED bulb including:
    an ultraviolet (UV) sensor;
    an infrared (IR) sensor;
    a CCD camera; and
    a far infrared (FIR) sensor; and
    electronic circuitry providing a response in the event that heat, flames or chemicals are detected by the sensor full-spectrum detection apparatus.

2. The smart LED bulb of claim 1, further including a software or hardware differentiator to distinguish the detected UV light over sunlight.

3. The smart LED bulb of claim 1, further including a smoke detector.

4. The smart LED bulb of claim 1, further including a carbon monoxide (CO) detector.

5. The smart LED bulb of claim 1, wherein the electronic circuitry includes communications between the smart LED bulb and a computer network.

6. The smart LED bulb of claim 1, wherein the computer network is in communication with a smartphone or other portable electronic device.

7. The smart LED bulb of claim 1, wherein the response includes automatically placing a call to 9-1-1 or other emergency number.

8. The smart LED bulb of claim 1, wherein the electronic circuitry includes communications through Blue Tooth, or other non-web based RF units.

9. The smart LED bulb of claim 1, wherein the response includes causing the one or more LEDs to flash or operative in a predetermined pattern.

10. The smart LED bulb of claim 1, further including a rechargeable battery or super capacitor to continue activation in the event of a power loss.

11. The smart LED bulb of claim 1, further including electronic circuitry enabling communications between a plurality of the smart LED bulbs.

12. The smart LED bulb of claim 1, wherein the response includes sounding an alarm.

13. The smart LED bulb of claim 1, wherein the response includes an indication showing the type of hazard and its location.

14. The smart LED bulb of claim 1 in communication with wall-mounted device.

15. The smart LED bulb of claim 1, further including circuitry for recognizing a security key.

16. The smart LED bulb of claim 1, further including a piezo device, speaker or other audio device that produces intense sound levels to alert the occupants of a hazard.

17. The smart LED bulb of claim 1, further including a speech synthesizer and a speaker so that the warning could pronounce words associated with an emergency situation.

18. The smart LED bulb of claim 1, further including an audio input for receiving voice commands and a memory for storing the commands for play-back purposes.

19. The smart LED bulb of claim 1, further including circuitry for communication with an existing sprinkler system.

\* \* \* \* \*